Nov. 21, 1967  J. R. RAUCH  3,353,395

END CRIMPING EQUIPMENT FOR ROUND CAPACITOR

Filed April 1, 1965  3 Sheets-Sheet 1

INVENTOR
JOSEPH R. RAUCH

BY
ATTORNEY

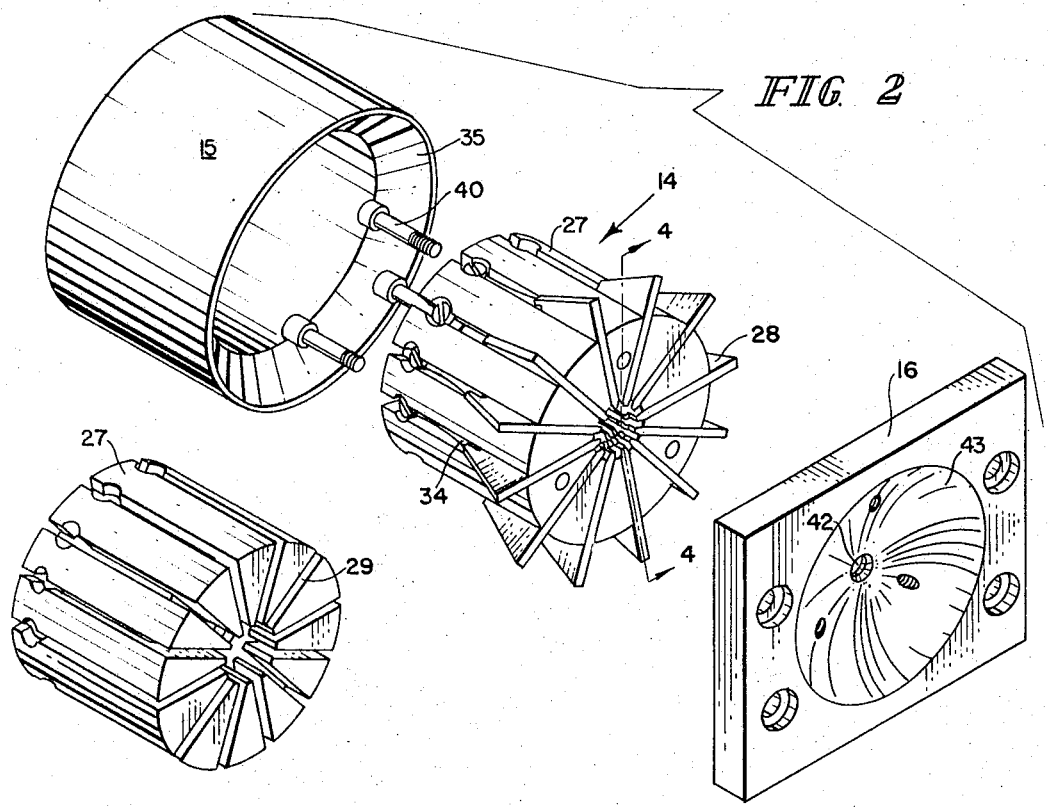
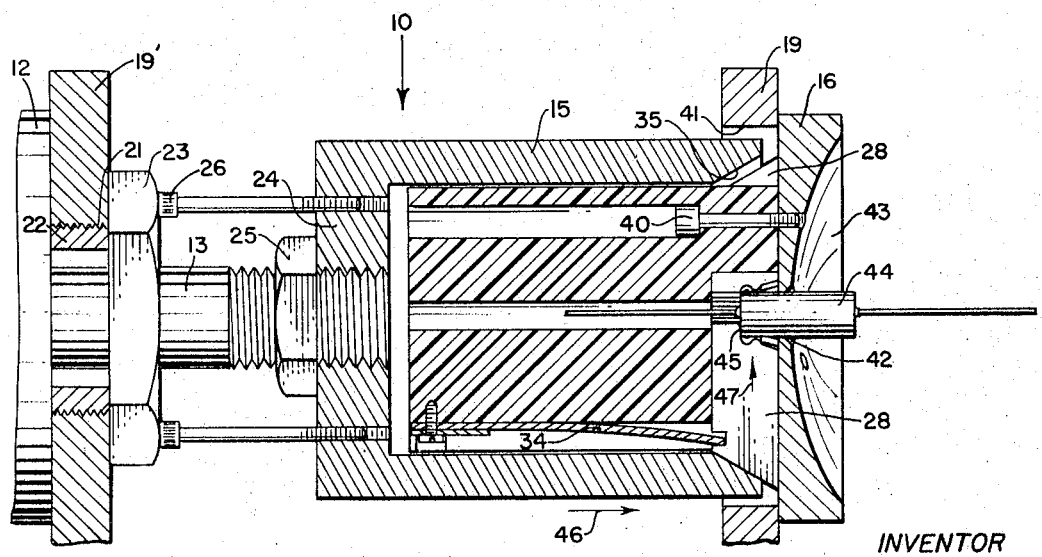

Nov. 21, 1967   J. R. RAUCH   3,353,395
END CRIMPING EQUIPMENT FOR ROUND CAPACITOR
Filed April 1, 1965   3 Sheets-Sheet 3

INVENTOR
JOSEPH R. RAUCH
BY
ATTORNEY

United States Patent Office 3,353,395
Patented Nov. 21, 1967

3,353,395
END CRIMPING EQUIPMENT FOR
ROUND CAPACITOR
Joseph R. Rauch, Indianapolis, Ind., assignor to P. R. Mallory & Co. Inc., Indianapolis, Ind., a corporation of Delaware
Filed Apr. 1, 1965, Ser. No. 444,587
11 Claims. (Cl. 72—402)

ABSTRACT OF THE DISCLOSURE

A plurality of fingers each having a predetermined shaping surface are positioned to form a circle such that the end of a capacitor can can be crimped in a substantially simultaneous fashion rather than progressively.

The present invention relates to a crimping means, more particularly to a novel end crimping device for crimping the end of a round capacitor.

Capacitor crimping devices are known and are used by several capacitor manufacturers. However, the several presently available capacitor crimping devices rotate the capacitor such that the end of the can of the capacitor is crimped by a pair of continuously rotating crimping wheels that engage the periphery of the can. The crimping wheels groove the can of the capacitor as the capacitor is rotated thereby crimping the end of the can. It was noted that the metal of the can immediately in front of the crimping wheels flows away from the crimp in much the same manner as a metal that is rolled between the nip of a plurality of roller means. The tendency of the metal to flow outwardly from the crimp, thins the metal of the can at the point where the crimping wheels engaged the can. It is seen that the crimp is the weakest point in the structure of the can. If the can ruptures, it will rupture at the weakest spot of the can which is the crimp. It was also noted that as the metal flows ahead of the crimping wheels, the end cap of the capacitor was turned slightly as a result thereof causing a cathode tab of the capacitor to twist and break away from the cathode. The breaking away of the cathode tab from the cathode causes irreparable damage to the capacitor and as a result thereof, renders the capacitor useless. It is seen that the need arises for a crimping means that does not thin the metal of the can at the point of the crimp but rather fashions a crimp that is smooth and round, and in fashioning the crimp, the crimping means does not twist and break the anode tab away from the anode.

By the accompanying drawings and specifications, the novel means and method whereby the present invention fulfills the required purpose will be disclosed.

Therefore, it is an object of the present invention to provide a capacitor crimping means for capacitor cans that does not thin the metal of the cans at the point of the crimp.

Another object of the present invention is to provide a capacitor crimping means that retains capacitor cans in a stationary position as the can is crimped.

A further object of the present invention is to provide a capacitor crimping means that does not twist the anode tab of a capacitor and thereafter break the anode tab away from the anode of the capacitor.

Yet another object of the present invention is to provide a capacitor crimping means that does not break off the end plug of a capacitor cap as the capacitor cap is being crimped.

Still another object of the present invention is to provide a capacitor crimping means having optimum reliability characteristics afforded by a compact construction having a minimum number of parts.

Yet still another object of the present invention is to provide a simple, efficient, effective, and accurate capacitor crimping means.

Another object of the present invention is to provide a crimping means that makes a crimp on the metal can of a capacitor that leaves the inside of the can smooth and round.

A further object of the present invention is to provide a capacitor crimping means that fashions a crimp substantially simultaneously in the capacitor rather than progressively.

The present invention in another of its aspects relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings.

The invention resides in the novel construction, combination, arrangement and cooperation of elements as hereinafter described and more particularly as defined in the appended claims.

The appended drawings illustrate the preferred embodiment of the present invention constructed to function in the most advantageous modes devised for the practical application of the basic principals involved in the hereinafter described invention.

In the drawings:

FIGURE 2 is a perspective view of the end crimping means for round capacitors with selected parts removed to illustrate the crimping means and the cooperatively associated sleeve means and guide means.

FIGURE 3 is a perspective view of the finger retaining means of the crimping means shown in FIGURE 2.

FIGURE 4 is a side view of the crimping means and the cooperatively associated sleeve means and the guide means taken across the lines 4—4 of FIGURE 2 illustrating the cooperative relationship between these parts just prior to engagement with a round capacitor.

Figure 1:
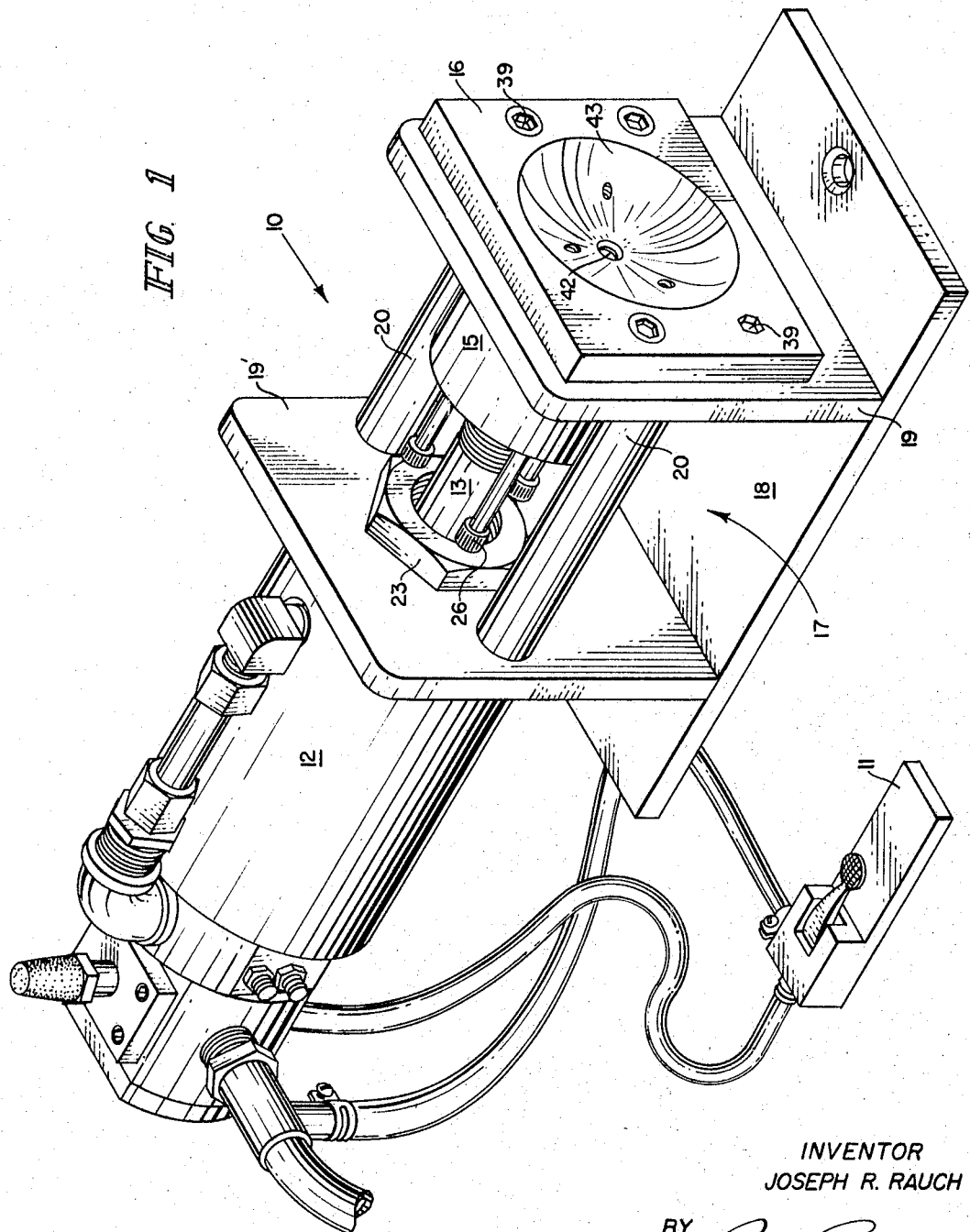
FIGURE 1 is a perspective view of the end crimping means for round capacitors.
Figure 5:
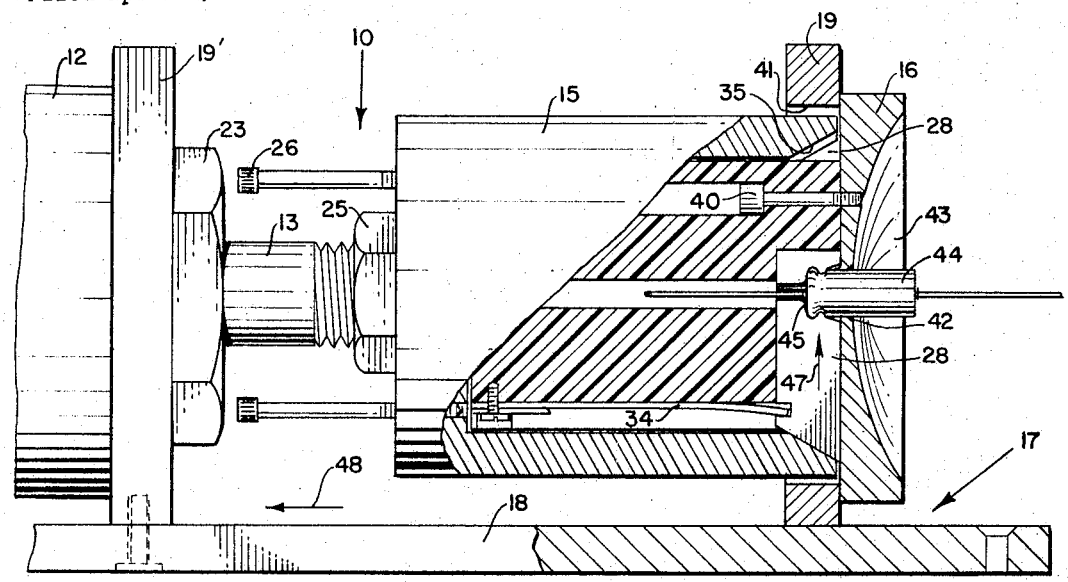
FIGURE 5 is a partial side view of the crimping means and the cooperatively associated sleeve means and the guide means illustrating the cooperative relationship between these parts and a round capacitor just after crimping the capacitor.

Generally speaking, the means and methods of the present invention relates to an end crimping device for round capacitors. The crimping device includes a drive means and a drive shaft coupled to and displaced by the drive means. A sleeve means is coupled to and displaced by the drive shaft. The sleeve means includes a beveled means or actuating surface. A crimping means interfits with the sleeve means and the crimping means includes a plurality of finger means. The finger means each include a ramped means and a shaping means. The ramped means engages with and rides up the beveled means of the sleeve means so as to displace the shaping means to engage with a round capacitor. Further displacement of the finger means causes the shaping means to crimp the round capacitor.

More particularly, the present invention relates to a novel end crimping device for round capacitors that utilizes radially spaced fingers to crimp a round capacitor. The crimping means includes a mounting means including a pair or apertured end plates in spaced parallel relationship. A drive means is fixedly coupled to a first one of the end plates. A drive shaft is coupled to and is displaced by the drive means. The drive shaft projects through the aperture of the first end plate. An apertured guide means is used for guiding and positioning a round capacitor can. The guide means is fixedly coupled to a second of the apertured plates so as to overlay the aperture of the second plate. A sleeve means is positioned between the end plates and the sleeve means is coupled to and displaced by the drive means. The sleeve means includes a beveled means. A finger retaining means is fixedly coupled to the guide means and interfits with the sleeve means. The finger retaining means includes a plurality of radial slots in spaced relationship. One of the finger means slidably interfit with a radial slot. The finger means each include a ramped extremity and a shaping extremity. The ramped extremity engages with and rides up the beveled extremity of the sleeve means so as to displace the shaping extremity of the finger means toward the capacitor can. The shaping extremity engages with the capacitor at a right angle to a line drawn tangent to the periphery of the capacitor. Further displacement of the shaping extremity crimps the capacitor in a substantially simultaneous fashion. A spring means is used for withdrawing the fingers from engagement with the capacitor upon completion of crimping the capacitor.

Referring now to the drawings which illustrate the preferred embodiment of the present invention, it is seen that the end crimping device for round capacitors is generally indicated by reference numeral 10. The end crimping equipment includes an actuator means such as a foot pedal 11 or the like, a drive means such as a hydraulic means 12 or the like, a drive shaft 13, and a crimping means 14. The foot pedal, the hydraulic means, and the drive shaft are utilized to provide a predetermined actuating force to the crimping means. Since the foot pedal, the hydraulic means, and the drive shaft may be of any suitable form, of which many can be conventionally used, a detailed showing of the foot pedal, the hydraulic means, and the shaft have been omitted from the drawings in the interest of a clearer showing of the inventive portion of the end crimping device for round capacitor cans. Suffice it to say that when an operator depresses the foot pedal, a fluid (not shown) is permitted to flow into a fluid chamber (not shown) of the hydraulic means. The fluid flow into the fluid chamber causes a piston means (not shown) contained within the hydraulic means to be displaced in the horizontal direction. The drive shaft fixedly attached to the piston means is also displaced in the horizontal direction thereby actuating the crimping means.

The essential components of the crimping means 14 are illustrated in FIGURES 2 to 6. The crimping means has cooperatively associated therewith a sleeve means 15 and an apertured guide means 16. A mounting means 17 includes a base plate and end plates 19 and 19' fixedly coupled to the base plate in spaced parallel relationship. The end plates are maintained in a spaced parallel relationship by a plurality of spacer posts 20. End plate 19' includes a threaded, centrally located aperture 21. A centrally located threaded projection 22 of the hydraulic means mates with and is turned into the threaded aperture of the end plate 19' until the extremity of the hydraulic means abuts the end plate. A threaded nut 23 is tuned onto the threaded projection until the nut abuts the end plate 19'. It is seen that the end plate is securely located between the extremity of the hydraulic cylinder and the nut 23 to thereby fixedly couple the hydraulic cylinder to the end plate 19'. The end plate 19' serves as a mounting support for the hydraulic means. The drive shaft 13, fixedly coupled to the piston of the hydraulic cylinder, projects through the aperture 21 of the end plate 19' a predetermined distance. It will be noted that the projecting extremity of the drive shaft is threaded.

The sleeve means 15 includes a centrally located aperture that is threaded. The sleeve means is turned onto the threaded drive shaft until the closed extremity 24 of the sleeve means abuts with nut 25 carried by the threaded portion of the drive shaft. The nut 25 serves to predeterminately locate the sleeve means on the drive shaft and frictionally couple the sleeve means to the drive shaft. A plurality of threaded stop rods 26 interfit with the closed extremity of the sleeve means and project outwardly therefrom toward threaded nut 23. In the initial position the ends of the stop rods 26 abut threaded nut 23. It is seen that the stop rods determine the amount of backstroke displacement experienced by the sleeve means.

Slidably interfitting with the sleeve means is crimping means 14. It is seen that the crimping means is concentric with the sleeve means. The crimping means is comprised of a finger retaining means or core 27 and a plurality of fingers 28. The finger retaining means includes a plurality of radially spaced slots 29. The plurality of slots are equally spaced each from the other and extend outwardly from the axis of the finger retaining means. Slidably retained within each of the plurality of radially extending slots is a finger means 30.

The finger means 30 includes a ramped means or extremity 31, a notch 32 contained in one of the sides of the finger means, and a shaping means or extremity 33. It is seen that the ramped means may have substituted therefore a roller or the like. At least one leaf spring means 34 has an extremity thereof fixedly coupled to the finger retaining means by any suitable means such as by bolts or the like. The other extremity of the leaf spring means interfits with notch 32 of the finger means in such a manner so as to spring bias the finger means outwardly from the axial center of the finger retaining means. The ramped portion of the finger means rides on the beveled surface or actuating surface 35 of the sleeve means. It is seen that as the ramped portion of the finger rides up the beveled surface of the finger retaining means, the finger is displaced inwardly or toward the axial center of the finger retaining means. As the ramped portion of the finger rides down the beveled surface of the finger retaining means, the finger is displaced outwardly or away from the axial center of the finger retaining means by the biasing action of the leaf spring means. The shaping extremity of the fingers includes a first side 36 and a second side 37 cut into the finger shaping extremity at predetermined angles to the longitudinal axis of the finger. The purpose for the first and second side being cut at an angle with the longitudinal axis of the finger will be disclosed hereinafter. The shaping surface 38 of the finger means is predeterminately shaped so as to fashion a crimp in the can of the capacitor at the appropriate point on the can. It will be noted that the shaping surface when viewed from the front or the rear is arcuately shaped. The purpose for arcuately shaping the shaping surface will appear hereinafter.

Fixedly coupled to end plate 19 is capacitor guide means 16. The guide means is fixedly coupled to the end plate by a plurality of bolts 39 turned into the end plate. A plurality of bolts 40 are turned into the guide means so as to fixedly couple the finger retaining means to the guide means. It is seen that centrally located aperture 41 of the end plate 19 is of sufficient diameter so that the finger retaining means and the sleeve means are free to move therein without engaging the surface wall of the aperture. It will be noted that the guide means is of sufficient dimensions so as to overlay the aperture 41 and engage the outermost surface of the end plate 19. Therefore, the fingers 28 are retained in the horizontal direction by the cooperative relationship between the finger retaining means and the guide means and are retained in the vertical direction by the beveled surface 35 of the sleeve means.

The guide mans includes a centrally located aperture 42 through which a round capacitor to be crimped is inserted. The aperture 42 is located at the bottom of a cup-shaped recess 43 cut into the guide plate. The cup-shaped recess is utilized to facilitate the placement of relatively small capacitors in the proper position within the aperture of the guide means by the operator.

Having described the structure of the present invention, the cooperation between the described elements will be disclosed.

A round capacitor 44 is inserted through the aperture 42 of the guide plate by the operator until the end of the capacitor abuts a portion 45 of each finger 28. The end of the round capacitor to be crimped now is seated in the proper position within the crimping means.

The operator depresses actuator means 11 thereby allowing a fluid (not shown) to flow into the fluid chamber (not shown) of the hydraulic means 12. The fluid forces a piston means (not shown) or the like and a cooperatively associated drive shaft outwardly in the direction of arrow 46 thereby axially displacing the sleeve means. The beveled surface 35 of the sleeve means engages the ramped surface 31 of each of the plurality of fingers 28. Further axial displacement of the sleeve means 15 in the direction of arrow 46 causes the plurality of fingers to be displaced inwardly in the direction of arrow 47 by the action of the ramped surface of the respective finger means sliding up the beveled surface of the sleeve means. The shaping surface 38 of the shaping extremity of each of the plurality of finger means engages the periphery of the can in equally spaced apart positions.

Figures 6, 7:
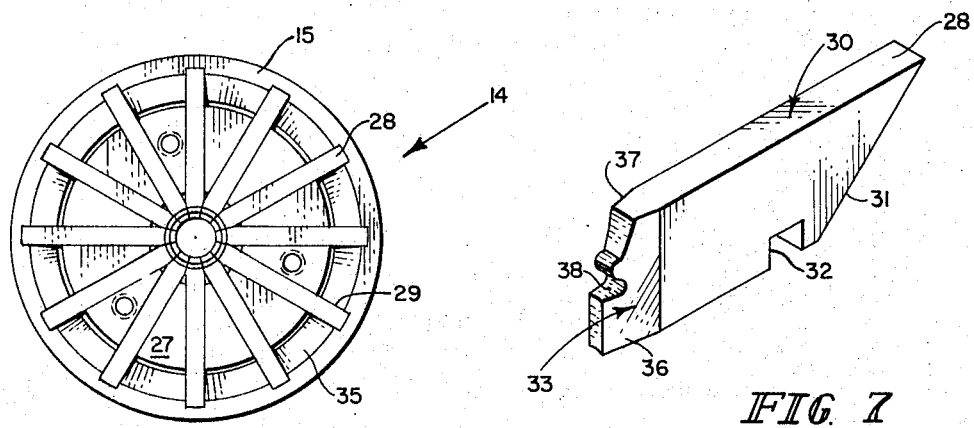
FIGURE 6 is a front view of the crimping means with the guide means removed to illustrate the plurality of fingers in the closed or crimping position of FIGURE 5.
FIGURE 7 is a perspective view of a finger means of the crimping means illustrating the components thereof.
Figures 8, 9:
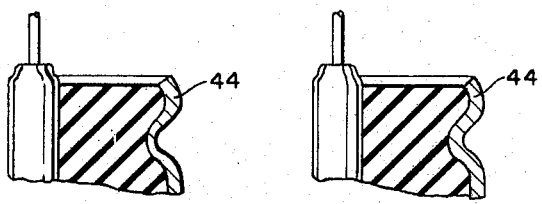
FIGURE 8 is a partial cross sectional view of a crimped round capacitor that was crimped using the present rolling techniques.
FIGURE 9 is a partial cross sectional view of a crimped round capacitor that was crimped using the means and methods of the present invention.

For illustrative purposes, assume that a ⅜ inch capacitor can is placed in the crimping means. It was found that with a ⅜ inch can a minimum of twelve blades of a width of .052 of an inch provided the maximum spacing of .014 of an inch between the sides of adjacent fingers as the fingers engage the periphery of the can. The further displacement of the fingers in the direction of arrow 47 causes the periphery of the can in contact with the fingers to assume the shape of the shaping surface 38 of the respective finger. It is seen that the inward movement of the fingers bring the first side of a finger closer to the second side of an adjacent finger until, as shown in FIGURE 6, the first side of a finger engages the second side of an adjacent finger. It is seen that due to the arcuate shape of shaping surface of the finger, that the twelve fingers combined to form a complete circle when the first side of a finger engages the second side of an adjacent finger. The capacitor is crimped by uniformly squeezing the portion of the periphery of the can toward its axis by a given number of identical shaped fingers. Each finger operates at a right angle to a line drawn tangent to the periphery of the can.

As disclosed hereinabove, it was found that with a ⅜ inch can the maximum separation between the first side and the second side of adjacent fingers is .014 of an inch. If a greater separation between the sides of adjacent fingers is used, it was found that the metal, as it is being crimped, flows between said adjacent fingers and hence is pinched therebetween causing an undesirable ridge. The ridge of metal between adjacent sides of the fingers will prevent the capacitor can from being fully crimped. If .014 of an inch of separation between adjacent blades is used, the metal flow is substantially under an adjacent finger thereby substantially preventing metal from being pinched between adjacent fingers. It will be noted that the foregoing pertains to a ⅜ inch can and that with a larger or a smaller can, the maximum distance between fingers and the number of fingers would vary accordingly.

Upon release of the fluid contained within the fluid chamber, the piston returns to its initial position, and in so doing the drive shaft is displaced in the directon of arrow 48. In so doing, the drive shaft carries therewith sleeve means 15. The beveled surface of the sleeve means disengages the ramped surface of each of the plurality of fingers. The energy stored by the leaf spring cooperatively associated with each of the fingers is released thereby initiating return of each of the fingers to its initial position. The fingers, upon reaching their respective initial positions, allow the crimped capacitor to be withdrawn from the crimping means. The crimping equipment is ready to crimp another capacitor in the fashion as described hereinbefore.

While the invention is illustrated and described in its preferred embodiment, it will be understood that modifications and variations may be effected without departing from the scope of the novel concepts of this invention and as set forth in the appended claims.

Having thus described my invention, I claim:

1. An end crimping device for a round capacitor can comprising: a mounting means including a pair of apertured end plates in spaced parallel relationship; a drive means fixedly coupled to a first one of said end plates; a drive shaft coupled to and displaced by said drive means, said drive shaft projecting through said aperture of said first end plate; an apertured guide means for guiding and positioning a round capacitor can, said guide means fixedly coupled to a second of said apertured plates so as to overlay said aperture of said plate; a sleeve means positioned between said end plates and said sleeve means coupled to and displaced by said drive means, said sleeve means including an actuating surface; a finger retaining means fixedly coupled to said guide means and interfitting with said sleeve means, said finger retaining means including a plurality of radial slots in spaced relationship; and a plurality of fingers, one each of said fingers slidably interfitting with said radial slots, said fingers engaging with said actuating surface of said sleeve means to displace said fingers to engagement with said capacitor and thereafter to crimp said capacitor as said drive shaft displaces said sleeve means.

2. An end crimping device for a round capacitor can comprising: a mounting means including a pair of apertured end plates in spaced parallel relationship; a drive means fixedly coupled to a first one of said end plates; a drive shaft coupled to and displaced by said drive means, said drive shaft projecting through said aperture of said first end plate; an apertured guide means for guiding and positioning a round capacitor can, said guide means fixedly coupled to a second of said apertured plates so as to overlay said aperture of said plate; a sleeve means positioned between said end plates and said sleeve means coupled to and axially displaced by said drive means, said sleeve means including an actuating surface; a finger retaining means fixedly coupled to said guide means and interfitting with said sleeve means, said finger retaining means including a plurality of radial slots in spaced relationship; and a plurality of fingers, one each of said fingers slidably interfitting with said radial slots, said fingers engaging with said actuating surface of said sleeve means to displace said fingers to engagement with said capacitor and thereafter to crimp said capacitor as said drive shaft axially displaces said sleeve means.

3. An end crimping device for a round capacitor can comprising: a mounting means including a pair of apertured end plates in spaced parallel relationship; a drive means fixedly coupled to a first one of said end plates; a drive shaft coupled to and displaced by said drive means, said drive shaft projecting through said aperture of said first end plate; an apertured guide means for guiding and positioning a round capacitor can, said guide means fixedly coupled to a second of said apertured plates so as to overlay said aperture of said plate; a sleeve means positioned between said end plates and said sleeve means coupled to and axially displaced by said drive means, said sleeve means including a beveled extremity; a finger retaining means fixedly coupled to said guide means and interfitting with said sleeve means, said finger retaining means including a plurality of radial slots in spaced realtionship; a plurality of fingers, one each of said fingers slidably interfitting with said radial slots, said fingers engaging with said beveled extremity of said sleeve means to displace said fingers to engagement with said capacitor at a right angle thereto and thereafter to crimp said capacitor as said drive shaft axially displaces said sleeve means; and a spring means for withdrawing said fingers from engagement with said capacitor upon completion of crimping said capacitor.

4. An end crimping device for a round capacitor can comprising: a mounting means including a pair of apertured end plates in spaced parallel relationship; a drive means fixedly coupled to a first one of said end plates; a drive shaft coupled to and displaced by said drive means, said drive shaft projecting through said aperture of said first end plate; an apertured guide means for guiding and positioning a round capacitor can, said guide means fixedly coupled to a second of said apertured plates so as to overlay said aperture of said plate; a sleeve means positioned between said end plates and said sleeve means coupled to and displaced by said drive means, said sleeve means including a beveled extremity; a finger retaining means fixedly coupled to said guide means and interfitting with said sleeve means, said finger retaining means including a plurality of radial slots in spaced relationship; a plurality of fingers, one each of said fingers slidably interfitting with said radial slots, said fingers each including a ramped extremity and a shaping extremity, said ramped extremity engaging with and riding up said beveled extremity of said sleeve means to displace said shaping extremity to engage with said capacitor at a right angle thereto and thereafter to crimp said capacitor as said drive shaft displaces said sleeve means, and a spring means for withdrawing said fingers from engagement with said capacitor upon completion of crimping said capacitor.

5. An end crimping device for a round capacitor can comprising: a mounting means including a pair of apertured end plates in spaced parallel relationship; a drive means fixedly coupled to a first one of said end plates; a drive shaft coupled to and displaced by said drive means, said drive shaft projecting through said aperture of said first end plate; an apertured guide means for guiding and positioning a round capacitor can, said guide means fixedly coupled to a second of said apertured plates so as to overlay said aperture of said plate; a sleeve means positioned between said end plates and said sleeve means coupled to and displaced by said drive means, said sleeve means including a beveled extremity; a finger retaining means fixedly coupled to said guide means and interfitting with said sleeve means, said finger retaining means including a plurality of slots in spaced relationship; a plurality of fingers, one each of said fingers slidably interfitting with said slots, said fingers engaging with said beveled extremity of said sleeve means to displace said fingers to engagement with said capacitor at a right angle thereto and thereafter to crimp said capacitor as said drive shaft displaces said sleeve means, and a spring means for withdrawing said fingers from engagement with said capacitor upon completion of crimping said capacitor.

6. An end crimping device for a round capacitor can comprising: a mounting means including a pair of apertured end plates in spaced parallel relationship; a drive means fixedly coupled to a first one of said end plates; a drive shaft coupled to and displaced by said drive means, said drive shaft projecting through said aperture of said first end plate; an apertured guide means for guiding and positioning a round capacitor can, said guide means fixedly coupled to a second of said apertured plates so as to overlay said aperture of said plate; a sleeve means positioned between said end plates and said sleeve means coupled to and axially displaced by said drive means, said sleeve means including a beveled extremity; a finger retaining means fixedly coupled to said guide means and interfitting with said sleeve means, said finger retaining means including a plurality of radial slots in spaced relationship; a plurality of fingers, one each of said fingers slidably interfitting with said radial slots, said fingers each including a ramped extremity and a shaping extremity, said ramped extremity engaging with and riding up said beveled extremity of said sleeve means to displace said shaping extremity to engage with said capacitor at a right angle thereto and thereafter to crimp said capacitor as said drive shaft axially displaces said sleeve means; and a spring means for withdrawing said fingers from engagement with said capacitor upon completion of crimping said capacitor.

7. In a crimping device for crimping the end portion of a round capacitor can, a drive means; a drive shaft coupled to and displaced by said drive means; a sleeve means coupled to and axially displaced by said drive shaft, said sleeve means including an actuating surface; a crimping means interfitting with said sleeve means, said crimping means including a plurality of finger means there being a sufficient number and spacing between such finger means to substantially simultaneously crimp said can substantially uniformly around its complete circumference, said finger means engaging with said actuating surface of said sleeve means to displace said finger means to engagement with said capacitor and thereafter to crimp said capacitor as said drive shaft axially displaces said sleeve means.

8. In a crimping device for crimping the end portion of a round capacitor can, a drive means; a drive shaft coupled to and displaced by said drive means; a sleeve means coupled to and axially displaced by said drive shaft, said sleeve means including an actuating surface; a crimping means interfitting with said sleeve means including a plurality of fingers there being a sufficient number and spacing between such finger means to substantially simultaneously crimp said can substantially uniformly around its complete circumference, said finger means each including means to position said capacitor can for crimping, said finger means engaging with said actuating surface of said sleeve means to displace said finger means to engagement with said capacitor so as to crimp said capacitor as said drive shaft axially displaces said sleeve means.

9. In a crimping device for crimping the end portion of a round capacitor can, a drive means; a drive shaft coupled to and displaced by said drive means; a sleeve means coupled to and axially displaced by said drive shaft, said sleeve means including a beveled means; a crimping means interfitting with said sleeve means, said crimping means including a plurality of finger means there being a sufficient number and spacing between such finger means to substantially simultaneously crimp said can substantially uniformly around its complete circumference, said finger means each including means to position said capacitor can for crimping, said finger means engaging with said beveled means of said sleeve means to displace said finger means to engagement with said capacitor so as to crimp said capacitor as said drive shaft axially displaces said sleeve means.

10. In a crimping device for crimping the end portion of a round capacitor can, a drive means; a drive shaft coupled to and displaced by said drive means; a sleeve means coupled to and axially displaced by said drive shaft, said sleeve means including a beveled means; a crimping means interfitting with said sleeve means; said crimping means including a plurality of finger means there being a sufficient number and spacing between such finger means to substantially simultaneously crimp said can substantially uniformly around its complete circumference, said finger means each including means to position said capacitor can for crimping, and further including a ramped means and a shaping means, said ramped means engaging said beveled means of said sleeve means to displace said shaping means to engagement with said capacitor so as to crimp said capacitor as said drive shaft displaces said sleeve means.

11. In a crimping device for crimping the end portion of a round capacitor can, a drive means; a drive shaft coupled to and displaced by said drive means; a sleeve means coupled to and axially displaced by said drive shaft, said sleeve means including a beveled means; a crimping means interfitting with said sleeve means; said crimping means including a plurality of finger means there being a sufficient number and spacing between such finger means to substantially simultaneously crimp said can substantially uniformly around its complete circumference, said finger means each including means to position said capacitor can for crimping and further including a ramped means and a shaping means, said ramped means engages with and rides up said beveled means of said sleeve means to displace said shaping means to engagement with said capacitor so as to crimp said capacitor as said drive shaft displaces said sleeve means.

References Cited
UNITED STATES PATENTS

| | | | |
|---|---|---|---|
| 2,211,622 | 8/1940 | Hunziker | 72—402 |
| 3,201,969 | 8/1965 | Harrison et al. | 72—402 |
| 3,234,776 | 2/1966 | Stoltz | 72—402 |

RICHARD J. HERBST, *Primary Examiner.*

R. D. GREFE, *Examiner.*